No. 896,401. PATENTED AUG. 18, 1908.
W. LEWIS.
METAL CUTTING SAW.
APPLICATION FILED JAN. 26, 1906.
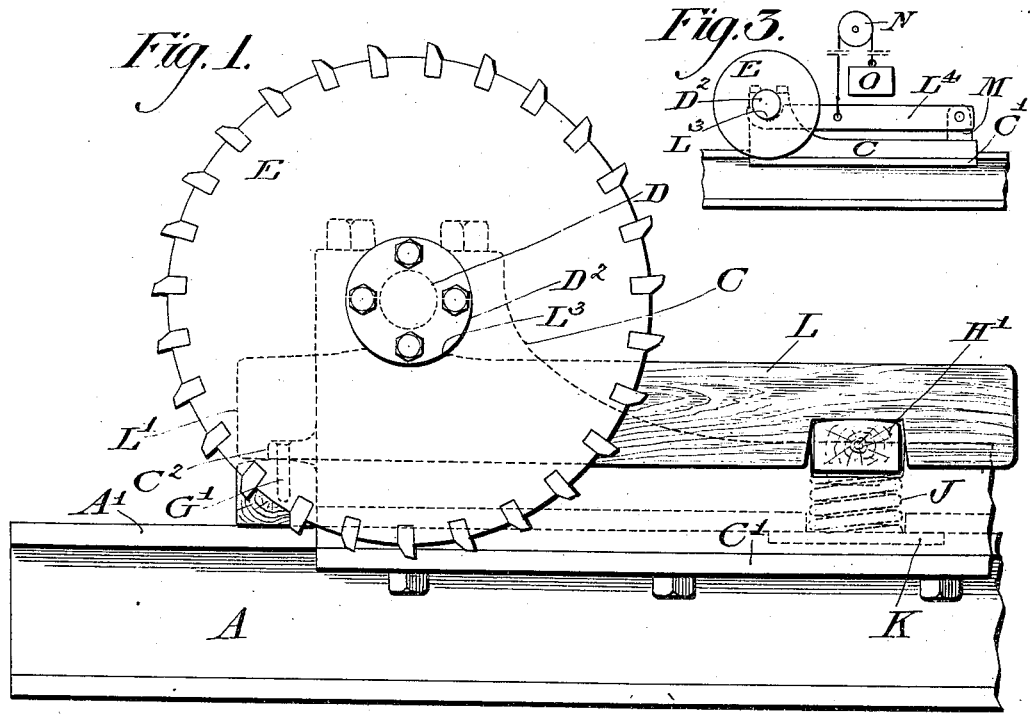
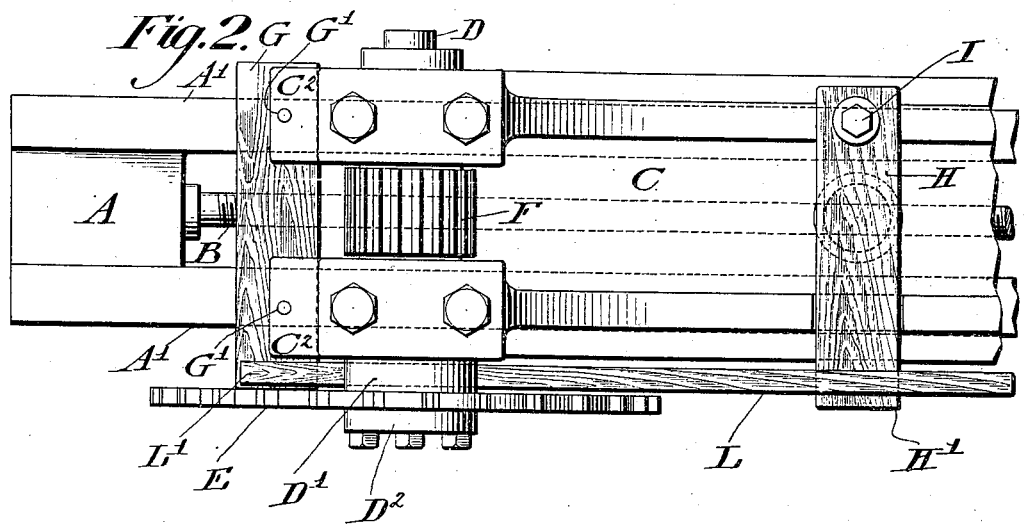
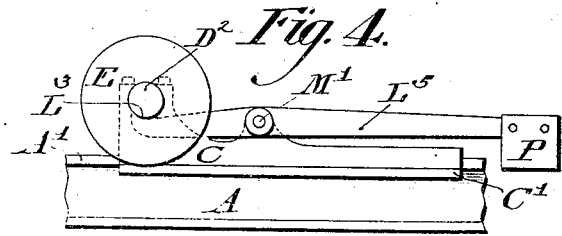
WITNESSES:
INVENTOR
Wilfred Lewis
BY
Francis J. Chambers
his ATTORNEY.

UNITED STATES PATENT OFFICE.

WILFRED LEWIS, OF PHILADELPHIA, PENNSYLVANIA, ASSIGNOR TO THE TABOR MANUFACTURING COMPANY, OF CAMDEN, NEW JERSEY, A CORPORATION OF NEW JERSEY.

METAL-CUTTING SAW.

No. 896,401.   Specification of Letters Patent.   Patented Aug. 18, 1908.

Application filed January 26, 1906. Serial No. 297,923.

*To all whom it may concern:*

Be it known that I, WILFRED LEWIS, a citizen of the United States of America, residing in the city and county of Philadelphia, in the State of Pennsylvania, have invented a certain new and useful Improvement in Metal-Cutting Saws, of which the following is a true and exact description, reference being had to the accompanying drawings, which form a part thereof.

My invention relates to metal sawing machines in which a circular disk provided with saw teeth is secured to and actuated by a rotating spindle supported in proper bearings on a housing, which housing, by preference, is one having capacity for a reciprocating movement on a spindle slideway.

In another application for Letters Patent filed by me November 17th, 1905, Serial No. 287,779, I have shown and described the use of resilient means acting to hold the spindle and the housing when a movable housing is used in contacting positions upon their bearings which correspond with those occupied when the saw is at work.

My present invention is for special appliances for accomplishing this same purpose, said appliances being more particularly devised and adapted for use in connection with machines not originally equipped with breaking mechanism of the kind shown and described in my former application.

The nature of my improvements will be best understood as described in connection with the drawings in which they are illustrated and in which Figure 1, is a side elevation of a saw equipped with my new mechanism in what I believe to be its most convenient form. Fig. 2, is a plan view of the saw shown in Fig. 1, and Figs. 3 and 4, are elevations of modified constructions of my appliance.

A, indicates the guideway or shears, the guideways proper being indicated at A', A'.

B, is a feed screw by means of which the housing is moved backward and forward on the guideway in the usual way.

C, is the housing supported on the guideway and secured in position thereon by flanges C', C'. As shown in Figs. 1 and 2, the housing is provided with projecting flanges $C^2$, $C^2$, in front.

D, is the saw supporting and actuating spindle secured in proper bearings on the housing and, as shown, provided with collars or abutment plates D', $D^2$, between which the saw E, is secured, F, indicating the gear wheel on the spindle by which it is rotated through the proper driving mechanism not shown.

G, is a beam resting on the slide in front of the housing and secured to move with the housing in any convenient way, as for instance by means of pins G', extending through the lugs $C^2$, into the beam G.

H, is a beam loosely secured to the housing at I, and having a projecting end H', which is pressed upward by resilient means, as shown by spring J, resting on a plate K, secured to the bottom of the housing, which is represented in Fig. 1, as cut away to give more room for the spring.

L, is a brake lever, the front end of which L', rests upon the fulcrum block or beam G, the rear end of the lever resting on the spring supported beam H, at its projecting end H', while an intermediate portion $L^3$, of the beam is conformed to and pressed against the spindle or spindle collar B'.

It will readily be seen that the action of the spring actuated brake lever is to press the spindle B, against its bearings in the housing in the same direction in which it is pressed by the resistance of the work when the saw is in use, and it will also be seen that the front end of the housing is also drawn upward by the action of the brake lever until it is brought and maintained in permanent contact with the slideway, just as is the case when the saw is at work.

In Fig. 3, I have indicated a modification of my device, in which a brake lever $L^4$, is fulcrumed on a projection M, of the housing and drawn upward against the spindle by the action of a weight O, connected to the brake lever by a cord running over a pulley N. In Fig. 4, the brake lever here indicated at $L^5$, is fulcrumed on the housing at M', and pressed against the spindle in the proper direction by a counter weight P.

In all the plans indicated it will be seen that the brake lever lies between the saw and the adjacent side of the guideway, and this is the most convenient place for its application where the construction of the machine is such as to permit it.

Having now described my invention, what I claim as new and desire to secure by Letters Patent is:

1. In a machine for sawing metals in combination; a housing, a saw spindle supported therein, and a brake for the saw consisting of a lever having a fulcrum occupying a fixed position with reference to the housing, and resting against the saw spindle on the side opposite to that which is pressed against the bearing when the saw is in use and resilient means acting on the lever to press it against the spindle.

2. In a machine for sawing metals in combination a housing slidingly supported on a guideway, a saw spindle supported therein, and a brake for the saw consisting of a lever having a fulcrum occupying a fixed position with reference to the housing, and resting against the saw spindle on the side opposite to that which is pressed against the bearing when the saw is in use and resilient means acting on the lever to press it against the spindle and to hold the housing permanently in the relative position on the guideway which it occupies when the saw is in use.

3. A machine for sawing metals having in combination a guideway, a housing slidingly supported thereon, a saw spindle supported in the housing and carrying a saw on its end, a brake lever contacting with the spindle between the saw and the spindle housing and resilient means for pressing the lever against the spindle to hold the spindle and housing in the same relative positions they occupy when the saw is at work.

4. A machine for sawing metals having in combination a guideway, a housing slidingly supported thereon, a saw spindle supported in the housing and carrying a saw on its end, a fulcrum block supported on the guideway in front of the housing connections for moving the fulcrum block with the housing, a brake lever engaging with the fulcrum block and with the spindle between the saw and the spindle housing and resilient means for turning the lever relative to the fulcrum block to press the lever against the spindle to hold the spindle and housing in the same relative positions they occupy when the saw is at work.

WILFRED LEWIS.

Witnesses:
　ARNOLD KATZ,
　D. STEWART.